US 011860870B2

(12) United States Patent
Viswanathan et al.

(10) Patent No.: US 11,860,870 B2
(45) Date of Patent: Jan. 2, 2024

(54) HIGH EFFICIENCY DATA QUERYING

(71) Applicant: Walmart Apollo, LLC, Bentonville, AR (US)

(72) Inventors: Arun Viswanathan, Santa Clara, CA (US); Eric Michael Machleder, Mill Valley, CA (US); Murabbat Riffaquat Hussain, Fremont, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 135 days.

(21) Appl. No.: 16/896,974

(22) Filed: Jun. 9, 2020

(65) Prior Publication Data
US 2021/0382896 A1 Dec. 9, 2021

(51) Int. Cl.
*G06F 16/2453* (2019.01)
*G06F 16/248* (2019.01)
*G06F 16/182* (2019.01)
*G06F 16/22* (2019.01)
*G06F 9/50* (2006.01)

(52) U.S. Cl.
CPC ...... *G06F 16/24542* (2019.01); *G06F 9/5027* (2013.01); *G06F 16/1824* (2019.01); *G06F 16/2282* (2019.01); *G06F 16/248* (2019.01); *G06F 2209/5018* (2013.01)

(58) Field of Classification Search
None
See application file for complete search history.

(56) References Cited

U.S. PATENT DOCUMENTS

| 8,812,752 | B1 | 8/2014 | Shih et al. |
| 8,924,974 | B1* | 12/2014 | Ruggiero ............ G06F 9/4843 718/101 |
| 10,558,614 | B2 | 2/2020 | Kuruvada et al. |
| 11,055,352 | B1* | 7/2021 | Beitchman ........ G06F 16/90335 |
| 11,500,755 | B1* | 11/2022 | Plenderleith ........ G06F 11/3604 |
| 2015/0293960 | A1* | 10/2015 | Sharma ............... G06F 16/2272 707/741 |
| 2016/0205218 | A1* | 7/2016 | Tan ...................... H04W 4/021 709/221 |
| 2016/0350091 | A1* | 12/2016 | Khot .................. G06F 16/9024 |
| 2017/0097950 | A1 | 4/2017 | Meacham et al. |
| 2017/0177263 | A1 | 6/2017 | Das et al. |

(Continued)

OTHER PUBLICATIONS

Luo et al., "LSM-based Storage Techniques: A Survey", (2019) pp. 1-25.

*Primary Examiner* — Dawaune A Conyers
(74) *Attorney, Agent, or Firm* — Morgan, Lewis & Bockius LLP; Manita Rawat (57) ABSTRACT

An approach is disclosed for optimizing jobs, which involve effective data retrieval across multiple data sources, via an externalized query pattern. The approach receives a query. The approach allocates computing power to one or more computing nodes to process a job for the received query. The approach determines whether the job for the received query corresponds to an identifier indexed in a search engine. The approach retrieves, in response to determining the job for the received query corresponds to the indexed identifier, attribute data corresponding to the indexed identifier from the search engine. The approach provides a response to the received query request, in which the response includes the attribute data corresponding to the indexed identifier.

20 Claims, 4 Drawing Sheets (56) References Cited

U.S. PATENT DOCUMENTS

2018/0089324 A1    3/2018  Pal et al.
2020/0034363 A1*  1/2020  Marquardt .......... G06F 16/2228
2020/0364223 A1* 11/2020  Pal .................... G06F 16/24539

* cited by examiner

HIGH EFFICIENCY DATA QUERYING

TECHNICAL FIELD

The disclosure relates generally to database systems, and more particularly, to job optimization, involving effective data retrieval across multiple data sources, via an externalized query pattern.

BACKGROUND

Conventional database systems may store and manage relatively large amounts of data. In addition, such database systems may provide a means to search through large amounts of data and return specific data in response to a submitted job involving complex queries. In a conventional database system, such as Apache Cassandra™, users submit the jobs to the database system by running full scans of the database system, and in turn, access the full data set within the conventional database system. As multiple users are submitting jobs involving complex queries to the same database system and as the amount of data within this system grows on a daily basis, service level agreements (SLA) for the job also increase, creating bottlenecks in one or more clusters of computing nodes within the database system. For instance, as more and more consumers submit the jobs to the same growing database for full data sets, the job searching constrains resources in certain clusters of computing nodes, such as Spark™ cluster computing nodes. Moreover, this searching chokes production in other clusters of computing nodes, such as Cassandra™ cluster computing nodes. In turn, the constrain and choking of various resources within the database system slows responses to the submitted jobs.

SUMMARY

The summary of the disclosure is given to aid understanding of database systems, and more particularly, to job optimization, involving effective data retrieval across multiple data sources, via an externalized query pattern, and not with an intent to limit the disclosure. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the systems, devices, and their methods of operation to achieve different effects. Certain aspects of the present disclosure provide a system, method, and non-transitory computer readable medium for data storage and job optimization.

In one or more aspects, the disclosed technology relates to a system that comprises a memory having instructions stored thereon, and a processor configured to read the instructions. In one or more cases, the processor is configured to read the instructions to receive a query. In one or more cases, the processor is configured to read the instructions to allocate computing power to one or more computing nodes to process a job for the received query. In one or more cases, the processor is configured to read the instructions to determine whether the job for the received query corresponds to an identifier indexed in a search engine. In one or more cases, the processor is configured to read the instructions to retrieve, in response to determining the job for the received query corresponds to the indexed identifier, attribute data corresponding to the indexed identifier from the search engine. In one or more cases, the processor is configured to read the instructions to provide a response to the received query request. In one or more cases, the response includes the attribute data corresponding to the indexed identifier.

In one or more other aspects, the disclosed technology relates to a method. In one or more cases, the method comprises receiving a query. In one or more cases, the method comprises allocating computing power to one or more computing nodes to process a job for the received query. In one or more cases, the method comprises determining whether the job for the received query corresponds to an identifier indexed in a search engine. In one or more cases, the method comprises retrieving, in response to determining the job for the received query corresponds to the indexed identifier, attribute data corresponding to the indexed identifier from the search engine. In one or more cases, the method comprises providing a response to the received query request. In one or more cases, the response including the attribute data corresponding to the indexed identifier.

In yet one or more other aspects, the disclosed technology relates to a computer program product. In one or more cases, the computer program product comprises a non-transitory computer readable medium having program instructions stored thereon. In one or more cases, the program instructions may be executable by one or more processors. In one or more cases, the program instructions comprise receiving a query. In one or more cases, the program instructions comprise allocating computing power to one or more computing nodes to process a job for the received query. In one or more cases, the program instructions comprise determining whether the job for the received query corresponds to an identifier indexed in a search engine. In one or more cases, the program instructions comprise retrieving, in response to determining the job for the received query corresponds to the indexed identifier, attribute data corresponding to the indexed identifier from the search engine. In one or more cases, the program instructions comprise providing a response to the received query request. In one or more cases, the response including the attribute data corresponding to the indexed identifier.

BRIEF DESCRIPTION OF THE DRAWINGS

The features and advantages of the present disclosure will be better understood when read in conjunction with the figures provided. Embodiments are provided in the figures for the purpose of illustrating aspects, and/or features, of the various embodiments, but the claims should not be limited to the precise arrangements, structures, features, aspects, methods, processes, assemblies, systems, or devices shown, and the arrangements, structures, features, aspects, methods, processes, assemblies, systems, and devices shown may be used singularly or in combination with other arrangements, structures, features, aspects, methods, processes, assemblies, systems, and devices.

DETAILED DESCRIPTION

The following discussion omits or only briefly describes conventional features of the data processing environment, which are apparent to those skilled in the art. It is noted that various embodiments are described in detail with reference to the drawings, in which like reference numerals represent like drawing elements throughout the figures. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. The objectives and advantages of the claimed subject matter will become more apparent from the following detailed description of these embodiments in connection with the accompanying drawings.

Unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Embodiments of the disclosure relate generally to database systems, and more particularly, to job optimization, involving effective data retrieval across multiple data sources, via an externalized query pattern. Embodiments that optimize jobs via externalized query patterns are described below with reference to the figures.

Figure 1:
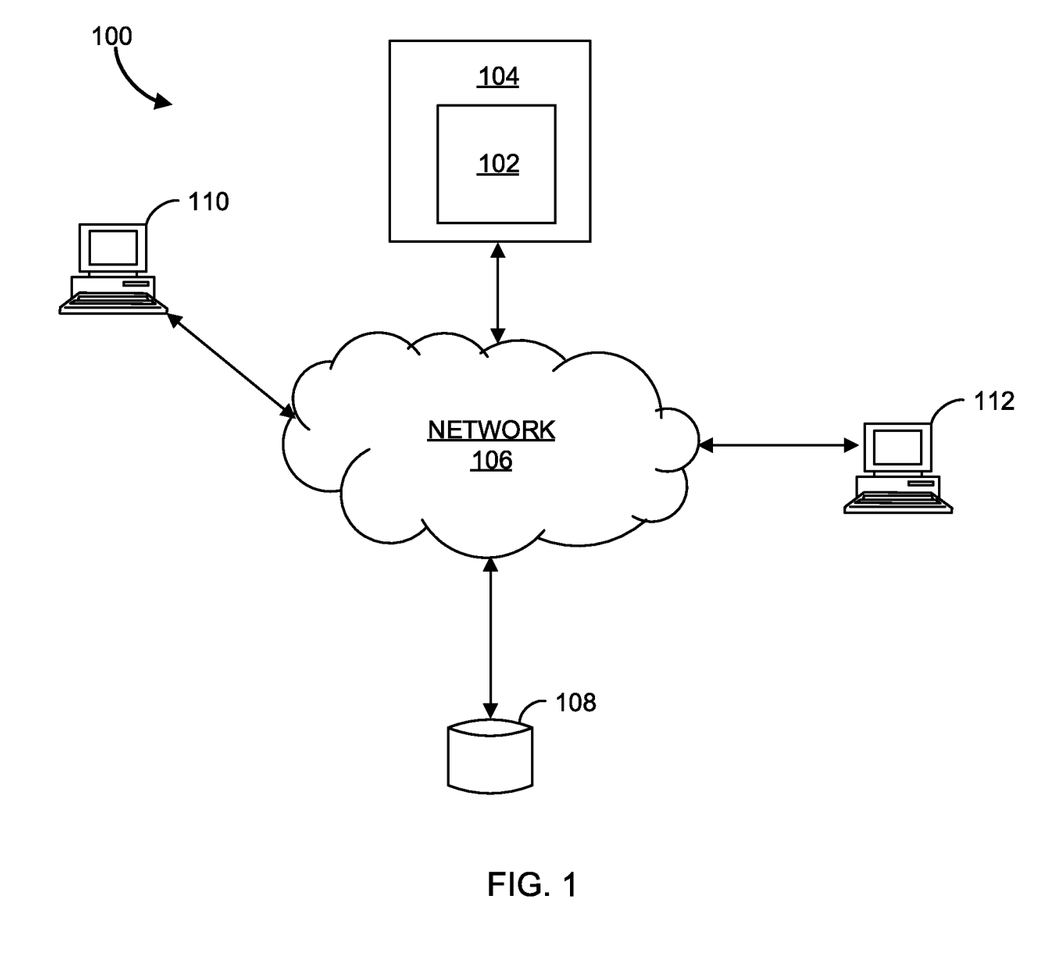
FIG. 1 is a functional block diagram of a data processing environment, in accordance with one or more embodiments.

FIG. 1 is a functional block diagram of a data processing environment 100. FIG. 1 provides only an illustration of one implementation and does not imply any limitations with regard to the environments in which different embodiments may be implemented. Many modifications of the depicted environment may be made by those skilled in the art without departing from the scope of the claims. In one or more cases, the data processing environment 100 includes a server 104, which operates a query optimization system 102 (hereinafter "system 102"), a data storage repository 108, and one or more computing devices, such as computing device 110 and computing device 112, coupled over a network 106. The server 104, system 102, data storage repository 108, and computing devices 110 and 112 can each be any suitable computing device that includes any hardware or hardware and software combination for processing and handling information, and transmitting and receiving data among the server 104, system 102, data storage repository 108, and computing devices 110 and 112. The server 104, system 102, data storage repository 108, and computing devices 110 and 112 can each include one or more processors, one or more field-programmable gate arrays (FPGAs), one or more application-specific integrated circuits (ASICs), one or more state machines, digital circuitry, and any other suitable circuitry capable of performing the operations of process 300.

The network 106 interconnects the server 104, the data storage repository 108, and one or both of the devices 110 and 112. In general, the network 106 can be any combination of connections and protocols capable of supporting communication between the server 104, the data storage repository 108, one or both of the computing devices 110 and 112, and the system 102. For example, the network 106 may be a WiFi® network, a cellular network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. In one or more cases, the network 106 may include wire cables, wireless communication links, fiber optic cables, routers, switches, firewalls, or any combination that can include wired, wireless, or fiber optic connections.

In one or more cases, the server 104 hosts the system 102. In one or more cases, the server 104 represents a computing system utilizing clusters of computing nodes and components (e.g., database server computer, application server computers, etc.) that act as a single pool of seamless resources, such as in a cloud computing environment, when accessed within data processing environment 100. In other cases, the server 104 can be a data center, which includes a collection of networks and servers, such as virtual servers and applications deployed on virtual servers, providing an external party access to the system 102. In some other cases, the server 104 may be a web server, a blade server, a mobile computing device, a laptop computer, a tablet computer, a netbook computer, a personal computer (PC), a desktop computer, or any programmable electronic device or computing system capable of receiving and sending data, via the network 106, and performing computer-readable program instructions.

In one or more cases, the data storage repository 108 may represent virtual instances operating on a computing system utilizing clusters of computing nodes and components (e.g., database server computer, application server computers, etc.) that act as a single pool of seamless resources when accessed within data processing environment 100. In one or more other cases, the data storage repository 108 may be one of, a web server, a mobile computing device, a laptop computer, a tablet computer, a netbook computer, a personal computer (PC), a desktop computer, or any programmable electronic device or computing system capable of receiving, storing, sending data, and performing computer readable program instructions capable of communicating with the server 104, and computing devices 110 and 112, via network 106. In one or more cases, the data storage repository 108 may be a storage device that is remote from the server 104. In one or more other cases, the data storage repository 108 may be a local storage device on the server 104, for example the storage repository 108 may be local on the one or more computing nodes.

In one or more cases, computing devices 110 and 112 are clients to the server 104. The computing devices 110 and 112 may be, for example, a desktop computer, a laptop computer, a tablet computer, a personal digital assistant (PDA), a smart phone, a thin client, a digital assistant, or any other electronic device or computing system capable of communicating with server 104 through network 102. For example, computing device 110 may be a desktop computer capable of connecting to the network 106 to send a query request to a processing engine 210 of the system 102. In one or more cases, one or both of the computing devices 110 and 112 may be any suitable type of mobile device capable of running mobile applications, including smart phones, tablets, slate, or any type of device that runs a mobile operating system. It is noted that data processing environment 100 includes computing devices 110 and 112 capable of interacting with system 102, but it should be understood that any number of computing devices may interact with system 102 in a same or similar manner as computing devices 110 and 112. In one or more cases, one or both of the computing devices 110 and 112 includes a user interface for providing an end user with the capability to interact with the system 102. For example, an end user of the computing device 110 may access the system 102 through the user interface to send a query request to the system 102. A user interface refers to the information (such as graphic, text, and sound) a program presents to a user and the control sequences the user employs to control the program. The user interface can be a graphical user interface (GUI). A GUI may allow users to interact with electronic devices, such as a keyboard and mouse, through graphical icons and visual indicators, such as secondary notations, as opposed to text-based interfaces, typed command labels, or text navigation.

Figure 2:
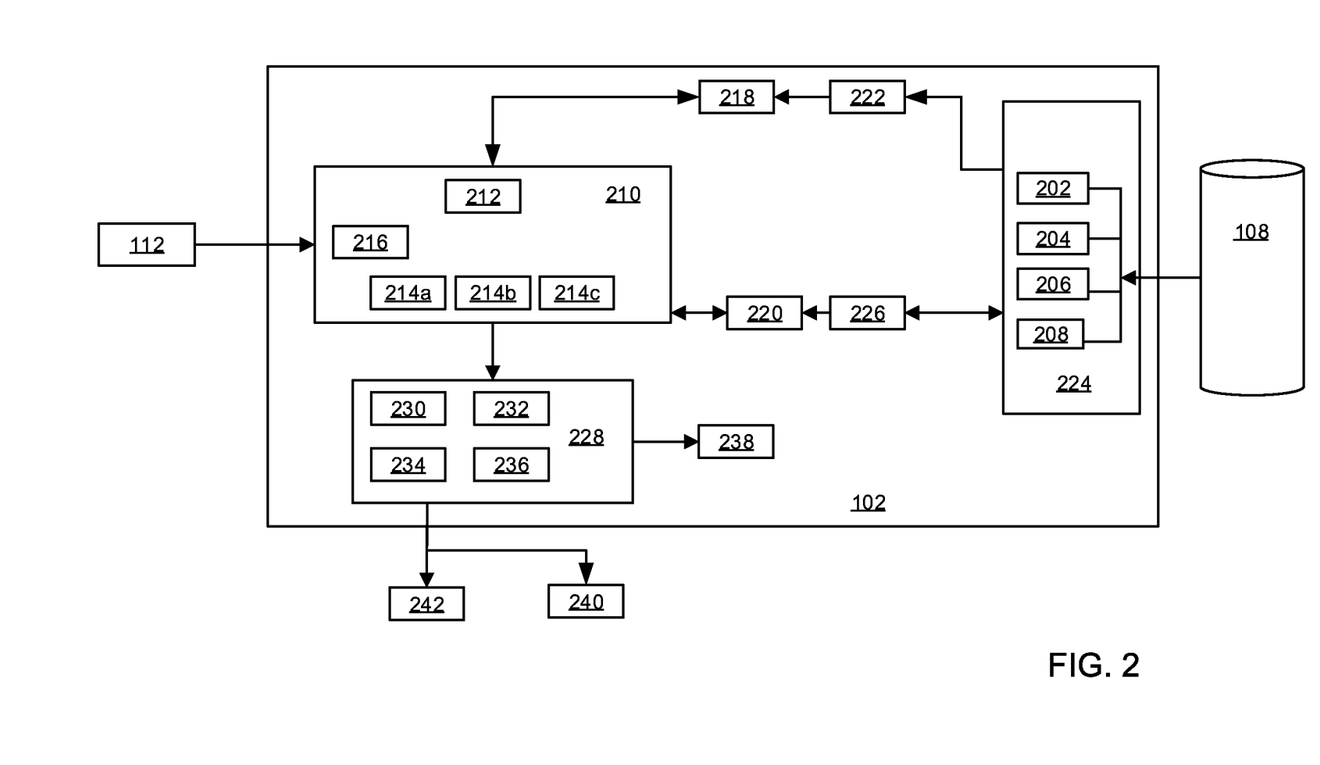
FIG. 2 is a functional block diagram illustrating components of the data processing environment of FIG. 1, in accordance with one or more embodiments.

FIG. 2 is a functional block diagram illustrating components of the data processing environment 100 of FIG. 1.

In one or more cases, the data storage repository 108 includes a holistic view, i.e., full data sets, of data related to the system 102. For example, the data storage repository 108 includes data corresponding to descriptive information of items offered for sale on an e-commerce website. For example, the descriptive information of an item may include, for example, but not limited to, a title of the item, a brand of the item, descriptive phrases of the item, size of the item, color of the item, usage instructions for the item, item ingredients, and the like. In another example, the data storage repository 108 includes data corresponding to a history of items purchased by a customer, e.g., historical transaction data indicating when and how often customers purchased an item, and/or history of item interactions by customers indicating how many times customers interacted with the item on the e-commerce website, e.g., by viewing the item, placing the item in the customer's online shopping cart, and other like interactions. In another example, the data storage repository 108 includes data corresponding to information regarding a status of one or more items. The status information may include, for example, but not limited to, a list of items within a certain store or a group of stores, a list of items that are ready for delivery, a list of items that are not ready for delivery, a list of items that qualify for special shipping (e.g., one-day shipping), and other like information regarding the status of an item. In yet another example, the data storage repository 108 includes data corresponding to an item setup orchestrator (ISO). In yet other example, the data storage repository 108 includes data corresponding to offers related to items, e.g., a current or past sale's price for an item. It is noted that a query submitted by a user may include a request for information based on a time period, one of the types of data described herein, and/or a combination of the types of data described herein.

In one or more cases, the system 102 includes the processing engine 210, a search engine 218, a distributed database management system 220, a distributed streaming engine 224, an indexing engine 222, a conduit engine 226, a file system 228, and a bedrock engine 238. In one or more examples, one or more of the processing engine 210, the search engine 218, the distributed database management system 220, the distributed streaming engine 224, the indexing engine 222, the conduit engine 226, the file system 228, and the bedrock engine 238 may be implemented in hardware. In one or more examples, one or more of the processing engine 210, the search engine 218, the distributed database management system 220, the distributed streaming engine 224, the indexing engine 222, the conduit engine 226, the file system 228, and bedrock engine 238 may be implemented as one or more executable programs maintained in a tangible, non-transitory memory, such as instruction memory 407 of FIG. 4, which may be executed by one or processors, such as processor 401 of FIG. 4.

In one or more cases, the processing engine 210 may be a distributed data processing engine that runs on one computer node or a cluster of computer nodes. The processing engine 210 may be configured to perform batch processing, streaming, distributed task dispatching, and scheduling; to provide responses to queries and utilize machine learning; and/or perform input/output functionalities. For example, the processing engine 210 may be an Apache Spark Core™ engine or other like engines. In one or more cases, the processing engine 210 may include cluster of computing nodes, such as a master computing node 212, a gateway computing node 216, and one or more worker computing nodes, such as worker computing node 214a, worker computing node 214b, and worker computing node 214c. The gateway computing node 216 may be configured to receive a query, e.g., query 1, from a computing device, such as computing device 110. The gateway computing node 216 may prepare the query request as a job, for example, but not limited to, a Spark™ job. The gateway computing node 216 may provide the job to the master computing node 212 for processing. The gateway computing node 216 may be, for example, a Chroniton™.

In one or more cases, the master computing node 210 analyzes the query request and creates a job (e.g., threepl-iml-feed for query 1) based on the query request. Having created the job, the master computing node 210 determines a number of processing cores and a size of memory needed to complete the job. In one or more cases, the number of processing cores and memory size may be predetermined for a corresponding job. For instance, when the master computing node 210 creates job threepl-iml-feed, the master computing node 210 may retrieve the number of processing cores and memory size from a lookup table that includes the number of processing cores and memory size for a corresponding job. Based on the number of processing cores and a size of the memory, the master computing node 212 allocates worker computing nodes with enough processing cores and memory size to complete the job. For example, the master computing node 212 may consume worker computing nodes 214a and 214b from the computing cluster, in which worker computing nodes 214a and 214b are capable of providing thirty (30) processing cores with a memory size of 120 GB to processed the threepl-iml-feed job. It should be noted that two worker computing nodes are described herein as completing the example job; however, it should be noted that one worker computing node or any number of worker computing nodes may be used to complete a job provided by the master computing node 212. To process the job, the processing engine 210, via one or more of the worker nodes 214a, 214b, and 214c, may read and write data to the search engine 218, the distributed database management system 220, and/or the file system 228 as discussed herein.

In one or more cases, the search engine 218 may be a scalable and fault-tolerant search engine. The search engine 218 provides distributed indexing and searching large scale data, such as text-centric data. For instance, the search engine 218 may be, for example, Apache Solr™ Elasticsearch™, or the like. In one or more cases, the search engine 218 may receive the job from the processing engine 210. Having received the job from the processing engine 210, the search engine 218 determines whether the job corresponds to an indexed identifier in the search engine 218. In one or more cases, the search engine 218 may search a lookup table to determine whether the job corresponds to an indexed identifier within the lookup table. The indexed identifier may be any number, character, sequence of numbers, sequence of characters, or sequence of a combination of numbers and characters to identify or refer to a query and/or job corresponding to the query that is indexed within the search engine 218. For the cases in which the search engine 218 determines that an indexed identifier corresponds to the query and/or respective job, the search engine 218 provides the determined index identifier and corresponding attributes to the processing engine 210.

In one or more cases, the distributed database management system 220 may be a scalable peer-to-peer distributed system of a cluster of computing nodes configured to handle large volumes of data (e.g. unstructured, structured, and semi-structured data) within the data storage repository 108. In one or more cases, the distributed database management system 220 may be a No Sequel (NoSQL) database management system, for example, but not limited to, Apache Cassandra™. One or more computing nodes within the peer-to-peer distributed system can accept a read or write request. For example, a computing node of the distributed database management system 220 may receive, from the processing engine 210 a read request for an example job that does not correspond to an indexed identifier within the search engine 218. Having received the read request for the job, the distributed database management system 220 may access the conduit engine 226 to retrieve the requested information for the job. The conduit engine 226 may write the requested information to the distributed database management system 220. The distributed database management system 220 provides the requested information, e.g., one or more attributes of the corresponding job to the processing engine 210.

In one or more cases, the conduit engine 226 may provide access to full data sets within the data storage repository 108. The conduit engine 226 may include a conduit that channels messages from the data storage repository 108 to a singular destination, such as the distributed database management system 220. Having received a read request from the distributed database management system 220, the conduit engine 226 submits a read request to the distributed streaming engine 224 for the requested job. The conduit engine 226 may be, for example, but not limited to, an Uber Conduit™.

In one or more cases, the conduit engine 226 may provide access to data sets within the data storage repository 108, via the distributed streaming engine 224. In one or more cases, the distributed streaming engine 224 is a distributed streaming platform, which is configured to publish and subscribe to streams of records. The distributed streaming engine 224 may be for example, but not limited to, Apache Kafka™. The distributed streaming engine 224 may be configured to publish and subscribe to data within the data storage repository 108. For example, the distributed streaming engine 224 can define and subscribe to one or more topics of data. Topics may include, for example, but not limited to, products 202, offers 204, ISO 206, and one or more other topics 208 that the distributed streaming engine 224 can define and subscribe. The data storage repository 108 may transfer records onto the corresponding defined topic. A record may include one or more attributes describing the corresponding data. For instance, attributes of a record may include key attributes, value attributes, timestamp attributes, and header attributes. The value attributes may be provided in for example, but not limited to, plain text format or JavaScript Object Notation (JSON) format. Having received the read request, the distributed streaming engine 224 may process the records corresponding to the topic of the read request and provide the records to the conduit engine 226. The conduit engine 226 may write the records and the one or more attributes describing the corresponding data of the record to the distributed database management system 220.

In one or more cases, the indexing engine 222 is configured to scan the topics, defined by the distributed streaming engine 224, for records corresponding to responses to query requests. For example, the indexing engine 222 may be configured to scan the topics for records corresponding to the most common query requests to the system 102. In one or more cases, the most common query requests may be those requests that are frequently submitted to the system 102. Having found one or more records in the corresponding topics, the indexing engine 222 writes the one or more records and the one or more corresponding attributes to the search engine 218. In one or more cases, the search engine 218 indexes the records and the one or more corresponding attributes as responses to a corresponding request.

In one or more cases, the file system 228 may be configured to receive and store responses to query requests from the processing engine 210. For example, the file system 228 may store the results from one or more jobs executed by the processing engine 210. In one or more cases, the file system 228 may include one or more storage systems, for example, but not limited to, a Hadoop™ distributed file system (HDFS) 230, Google Storage™ (GS) 232, distributed object storage 234 (e.g., OpenStack Swift™), and Azure™ file storage 236, and other like storage systems.

The file system 228 may receive requests from one or more external or internal data querying tools. In one or more cases, the file system 228 allows an external user to submit data queries to system 102. In one or more cases, the file system 228 receives responses to the queries from the system 102, without allowing the external user access to one or more other components of the system 102, for example, but not limited to, the processing engine 210, the search engine 218, the distributed database management system 220, the distributed streaming engine 224, the indexing engine 222, and the conduit engine 226.

In one or more cases, an internal data querying tool may include a Bedrock™ engine 238. The Bedrock™ engine 238 may be a downstream engine that is internal to the system 102. The Bedrock™ engine 228 is configured to receive and process a request by uploading data stored in the file system 228 to one or more servers that are external to the system 102. In one or more cases, external data querying tools may include, for example, but not limited to, a distributed sequential (SQL) querying engine 240, a web-based notebook 242, and the like. The distributed SQL query engine 240 and web-based notebook 242 are each configured to provide interactive analytical querying on data stored within the file system 228. For instance, the distributed SQL query engine 240 may provide an end user the ability to submit a query to the distributed SQL query engine 240. The distributed SQL query engine 240 queries across HDFS 230, GS 232, distributed object storage 234, and Azure file storage 236, and returns the combined data for one or more of these storage systems as a response to the query. In one or more cases, the distributed SQL query engine 240 may operate on a distributed cluster of computer nodes, in which the cluster of computer nodes scale in size based on the submitted query. The distributed SQL query engine 240 may be, for example, but not limited to, Presto™. In another instance, the web-based notebook 242 is a browser-based notebook that may provide the end user the ability to submit a query to the web-based notebook 242, which in turn searches the file system 228 for responses to the query. The web-based notebook 242 may be, for example, but not limited to, Apache Zeppelin™. In one or more cases, the distributed SQL query engine 240 and the web-based notebook 242 may be implemented in hardware. In one or more other cases, the distributed SQL query engine 240 and the web-based notebook 242 may be implemented as an executable program maintained in a tangible, non-transitory memory, which may be executed by one or processors of an external user's computing device.

Figure 3:
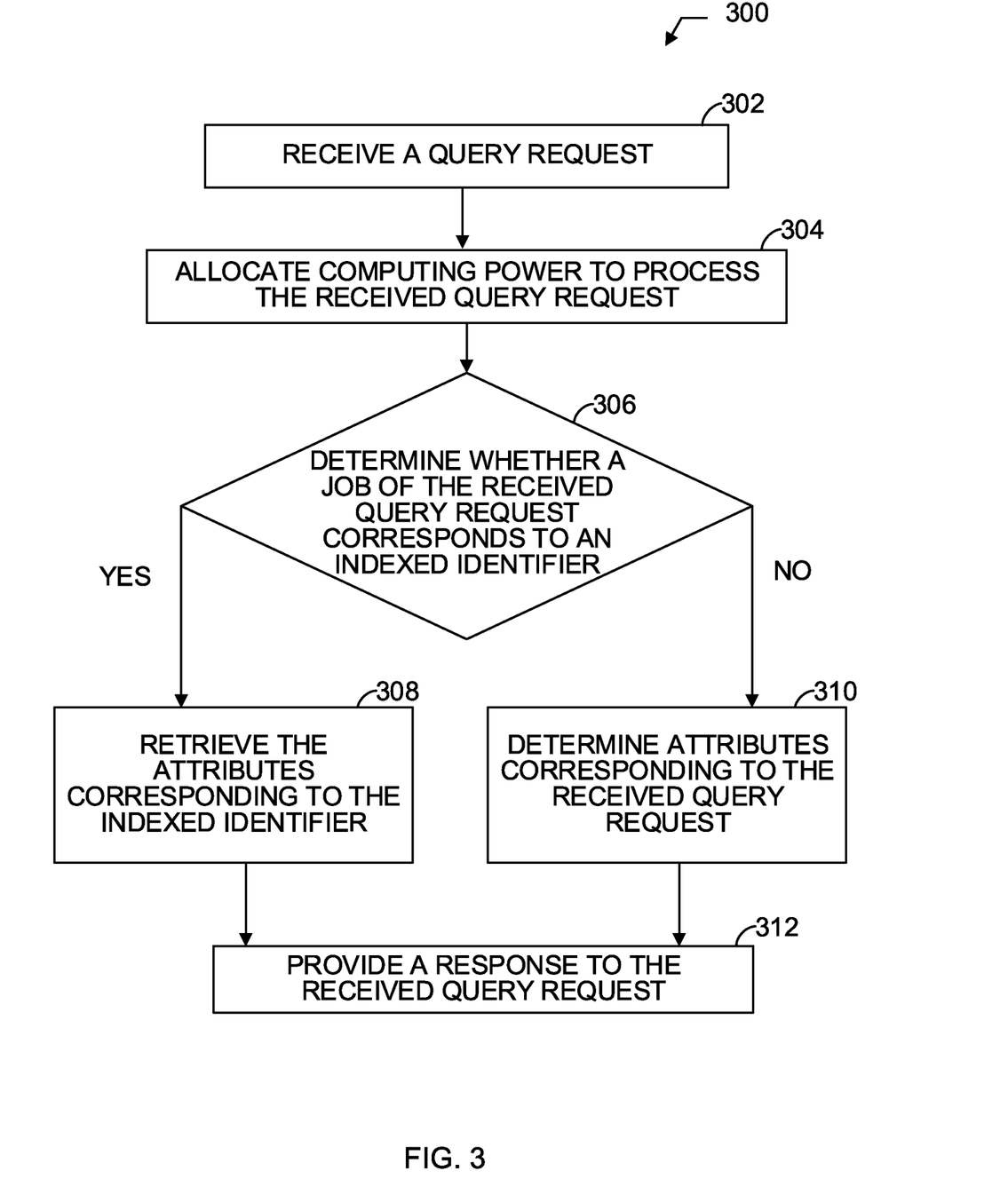
FIG. 3 is a flowchart illustrating a process of data storage and querying optimization, in accordance with one or more embodiments.

FIG. 3 is a flowchart illustrating a process 300 of data storage and querying optimization.

A query request is received (302), preferably by the processing engine 210. In one or more cases, the gateway computing node 216 of the processing engine 210 receives the query request from a computing device, such as computing device 112. For example, a user from a grouping team may submit a query (e.g., query 1), via the computing device 112, to the processing engine 210. In another example, another user from a LIMO team may submit a query (e.g., query 2), to the processing engine 210. Having received the query request, the master computing node 212 creates a job. For example, the master computing node 212 may create job grouping-cp-feed for the query 2 request submitted by the grouping team. In another example, the master computing node 212 creates job threepl-iml-feed for the query 1 request submitted by the LIMO team.

Computing power is allocated to process the received request (304), preferably by the processing engine 210. In one or more cases, the master computing node 212 determines a number or processing cores and a size of memory need to complete the job. For example, the master computing node 212 determines that 80 cores with a memory size of 320 GB are needed to complete job grouping-cp-feed for query 2. In another example, the master computing node 212 determines that 30 cores with a memory size of 120 GB are needed to complete job threepl-iml-feed for query 1. Based on the number of processing cores and a size of the memory, the master computing node 212 allocates worker computing nodes with enough processing cores and memory size to complete the job. For example, the master computing node 212 allocates two worker nodes to the job threepl-iml-feed and three worker nodes to job grouping-cp-feed.

A determination is made (306), preferably by the search engine 218, as to whether a job the received query request corresponds to an indexed identifier. In one or more cases, the worker nodes may submit a read request to the search engine 218 to determine whether an indexed identifier corresponds to the received query request. In one or more cases, the search engine 218 may search a lookup table to determine whether the job corresponds to an indexed identifier within the lookup table. For the cases in which the search engine 218 determines that the job for the received request corresponds to an indexed identifier (306: YES), the search engine 218 retrieves one or more attributes corresponding to the indexed identifier (308). For example, the search engine 218 may determine that the threepl-iml-feed job for query 1 has a corresponding indexed identifier in the search engine 218. The search engine 218 provides the one or more attributes of the corresponding indexed identifier to the processing engine 210 as a response to the received query request and completes the job. In an example, the system 102 may process the threepl-iml-feed job within two hours. In another example, if the system 102 were unable to process the job, via determining that the threepl-iml-feed job did not have a corresponding indexed identifier in the search engine 218, the system 102 may determine the one or more attributes of the threepl-iml-feed job, in a manner as described herein. However, as opposed to taking two hours with 30 cores and a memory size of 120 GB to complete the job for the cases in which the job has a corresponding indexed identifier, the system 102 may process the threepl-iml-feed job in five hours with 60 cores and 240 GB of memory.

For the cases in which the search engine 218 determines that the job for the received request does not corresponds to an indexed identifier (306: NO), the search engine 218 sends a notification to the processing engine 210 that there is not an indexed identifier in the search engine 218 that corresponds to the query request. For example, the search engine 218 may determine that grouping-cp-feed job for query 2 does not have a corresponding indexed identifier in the search engine 218. Having received the notification, attributes corresponding to the received query request are determined (310), preferably by the distributed database management system 220. In one or more cases, a computing node of the distributed database management system 220 may receive, from the processing engine 210 a read request for the job that did not correspond to an indexed identifier within the search engine 218. The distributed database management system 220 accesses the conduit engine 226 to retrieve the requested information for the job. The conduit engine 226 submits a read request to the distributed streaming engine 224 for the requested job. The distributed streaming engine 224 may process one or more records of data within the data storage repository 108 as described herein. For instance, the distributed streaming engine 224 may process the records corresponding to the topic of the read request and provide the records to the conduit engine 226. The conduit engine 226 may write the records and the one or more attributes describing the corresponding data of the record to the distributed database management system 220.

Having received the one or more attributes, the distributed database management system 220 provides the attributes to the processing engine 210. In an example, the system 102 may process the grouping-cp-feed within six hours. In another example, if the system 102 were able to process the job, via determining that the grouping-cp-feed did have a corresponding indexed identifier in the search engine 218, the system 102 may determine the one or more attributes of the grouping-cp-feed, in a manner as described herein. However, as opposed to taking six hours with 80 cores and a memory size of 320 GB to complete the job for the cases in which the job does not have a corresponding indexed identifier, the system 102 may process the grouping-cp-feed job in 30 minutes with 50 cores and 200 GB of memory.

In one or more cases, the processing engine 210 provides a response to the received query request (312). In one or more cases, the processing engine 210 provides a response to the received query request by providing the one or more attributes corresponding to the indexed identifier to the file systems 228. The file system 228 may receive and store the response to the query request in the one or more storage systems of the file system 228, for example, but not limited to, HDFS 230, GS 232, distributed object storage 234, and Azure™ file storage 236. The file system 228 may receive and process requests from one or more external or internal data querying tools, as described herein.

Figure 4:
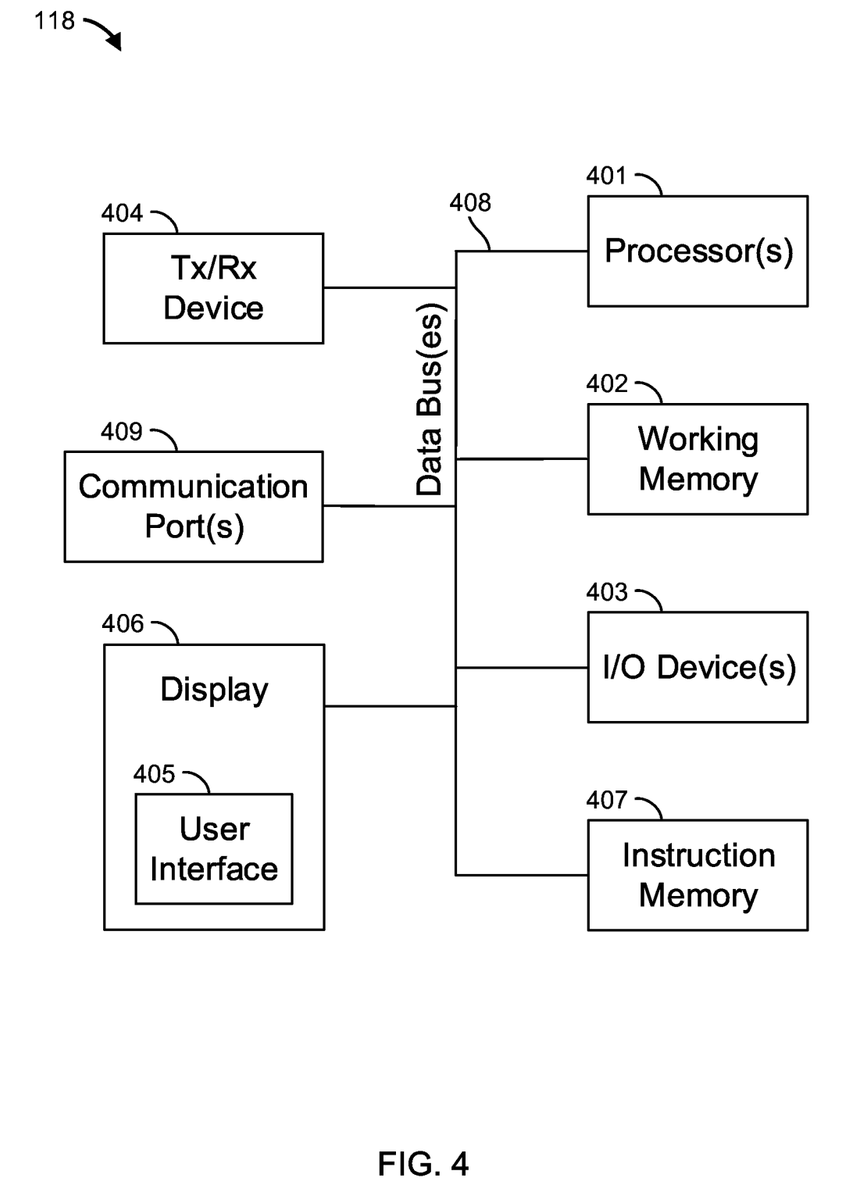
FIG. 4 depicts a block diagram of components of a computing device capable of performing the processes described herein, in accordance with one or more embodiments.

FIG. 4 depicts a block diagram of components of a computing device capable of performing the processes described herein. In particular, FIG. 4 illustrates an example computing device, such as computing device 118, capable of interacting with the system 102 of FIG. 1.

Computing device 118 can include one or more processors 401, working memory 402, one or more input/output devices 403, instruction memory 407, a transceiver 404, one or more communication ports 409, and a display 406, all operatively coupled to one or more data buses 408. Data buses 408 allow for communication among the various devices. Data buses 408 can include wired, or wireless, communication channels.

Processors 401 can include one or more distinct processors, each having one or more cores. Each of the distinct processors can have the same or different structure. Processors 401 can include one or more central processing units (CPUs), one or more graphics processing units (GPUs), application specific integrated circuits (ASICs), digital signal processors (DSPs), and the like.

Processors 401 can be configured to perform a certain function or operation by executing code, stored on instruction memory 407, embodying the function or operation. For example, processors 401 can be configured to perform one or more of any function, method, or operation disclosed herein.

Instruction memory 407 can store instructions that can be accessed (e.g., read) and executed by processors 401. For example, instruction memory 407 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 401 can store data to, and read data from, working memory 402. For example, processors 401 can store a working set of instructions to working memory 402, such as instructions loaded from instruction memory 407. Processors 401 can also use working memory 402 to store data created during the operation of system 102. Working memory 402 can be a random access memory (RAM) such as a static random access memory (SRAM) or dynamic random access memory (DRAM), or any other suitable memory.

Input-output devices 403 can include any suitable device that allows for data input or output. For example, input-output devices 403 can include one or more of a keyboard, a touchpad, a mouse, a stylus, a touchscreen, a physical button, a speaker, a microphone, or any other suitable input or output device.

Communication port(s) 409 can include, for example, a serial port such as a universal asynchronous receiver/transmitter (UART) connection, a Universal Serial Bus (USB) connection, or any other suitable communication port or connection. In some examples, communication port(s) 409 allows for the programming of executable instructions in instruction memory 407. In some examples, communication port(s) 409 allow for the transfer (e.g., uploading or downloading) of data, such as transaction data.

Display 406 can display user interface 405. User interfaces 405 can enable user interaction with, for example, computing device 112 or 118. For example, user interface 405 can be a user interface for an application of a retailer that allows a customer to purchase one or more items from the retailer. In some examples, a user can interact with user interface 405 by engaging input-output devices 403. In some examples, display 406 can be a touchscreen, in which the touchscreen displays the user interface 405.

Transceiver 404 allows for communication with a network, such as the network 106 of FIG. 1. For example, if network 106 of FIG. 1 is a cellular network, transceiver 404 is configured to allow communications with the cellular network. In some examples, transceiver 404 is selected based on the type of network 106 system 102 will be operating in. Processor(s) 401 is operable to receive data from, or send data to, a network, such as network 106 of FIG. 1, via transceiver 404.

Although the embodiments discussed herein are described with reference to the figures, it will be appreciated that many other ways of performing the acts associated with the embodiments can be used. For example, the order of some operations may be changed, and some of the operations described may be optional.

In addition, the embodiments described herein can be at least partially implemented in the form of computer-implemented processes and apparatus. The disclosed embodiments may also be at least partially implemented in the form of tangible, non-transitory machine-readable storage media encoded with computer program code. For example, the processes described herein can be implemented in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the embodiments. The embodiments may also be at least partially implemented in the form of a computer into which computer program code is loaded or executed, such that, the computer becomes a special purpose computer for practicing the embodiments. When implemented on a general-purpose processor, the computer program code segments configure the processor to create specific logic circuits. The embodiments may alternatively be at least partially implemented in application specific integrated circuits for performing the embodiments.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. A system comprising:
a memory having instructions stored thereon, and a processor configured to read the instructions to:
receive a job including an identifier associated with a received query from an external query tool;
allocate computing power to one or more computing nodes to process the job;
determine whether the identifier corresponds to an indexed identifier in a search engine;
retrieve, by the search engine and in response to determining the received query corresponds to the indexed identifier, attribute data corresponding to the indexed identifier, wherein the search engine provides the attribute data and the indexed identifier to a processing engine;
in response to determining the received query does not correspond to the indexed identifier;

provide the received query to a distributed database management system implemented by the one or more computing nodes;
access, by the distributed database management system, a conduit engine;
generate, by the conduit engine, a read request to retrieve the attribute data corresponding to the job from a distributed streaming engine configured to subscribe to streams of records within an internal data storage repository;
receive, by the conduit engine and in response to the read request, the attribute data from the distributed streaming engine;
store, by the conduit engine, the attribute data in a file system associated with the distributed database management system, wherein the conduit engine is configured to channel the attribute data only to the file system; and
in response to writing the attribute data to the file system, obtain, by the distributed database management system, the attribute data from the file system; and
in response to obtaining the attribute data, provide, by the distributed database management system, the attribute data to the processing engine;
based at least in part on the attribute data, process the job for the received query; and
provide a response to the received query request, the response including the attribute data.

2. The system of claim 1, wherein the processor is configured to allocate computing power by:
determining, by a master computing node, a number of processing cores and a memory size to process the job; and
allocate, by the master computing node, the one or more computing nodes having the determined number of processing cores and memory size to process the job.

3. The system of claim 1, wherein the processor is further configured to determine whether the identifier associated with the received query corresponds to the indexed identifier further by searching a lookup table within the search engine to determine whether the identifier associated with the received query corresponds to the indexed identifier.

4. The system of claim 1, wherein the processor, in response to determining the received query does not correspond to the indexed identifier, is further configured to:
scan, by an indexing engine, one or more topics of record data defined by the distributed streaming engine to determine records corresponding to responses to the received query, the record data includes the attribute data describing the record data; and
index the record data and the attribute data corresponding to the responses to the received query.

5. The system of claim 1, wherein the processor is further configured to determine, in response to determining the identifier for the received query does not correspond to the indexed identifier, other attribute data corresponding to the received query request from a distributed database.

6. The system of claim 5, wherein the processor is further configured to determine the one or more attributes corresponding to the received query request from the distributed database by:
accessing full data sets within a data storage repository;
scanning one or more topics of record data of the full data sets to determine records corresponding to responses to the received query, the record data includes the other attribute data describing the record data; and
providing the other attribute data describing the record data from the full data set.

7. The system of claim 1, wherein the processor is further configured to:
store the one or more attributes in one or more storage systems of an external user file system;
receive another query from an external user;
query across the one or more storage systems to process the other received query;
combine, from the one or more storage systems, data corresponding to the other received query; and
provide the combined data as a response to the other received query.

8. A method comprising:
receiving a job including an identifier associated with a received query;
allocating computing power to one or more computing nodes to process the job for;
determining whether the identifier corresponds to an indexed identifier in a search engine;
retrieving, by the search engine and in response to determining the received query corresponds to the indexed identifier, attribute data corresponding to the indexed identifier, wherein the search engine provides the attribute data and the indexed identifier to a processing engine;
in response to determining the received query does not correspond to the indexed identifier;
providing the received query to a distributed database management system implemented by the one or more computing nodes;
accessing, by the distributed database management system, a conduit engine;
generating, by the conduit engine, a read request to retrieve the attribute data corresponding to the job from a distributed streaming engine configured to subscribe to streams of records within an internal data storage repository;
receiving, by the conduit engine and in response to the read request, the attribute data from the distributed streaming engine;
storing, by the conduit engine, the attribute data in a file system associated with the distributed database management system, wherein the conduit engine is configured to channel the attribute data only to the file system; and
in response to writing the attribute data to the file system, obtaining, by the distributed database management system, the attribute data from the file system; and
in response to obtaining the attribute data, providing, by the distributed database management system, the attribute data to the processing engine;
based at least in part on the attribute data and the indexed identifier, processing the job for the received query; and
providing a response to the received query request, the response including the attribute data.

9. The method of claim 8, wherein allocating the computing power comprises:
determining, by a master computing node, a number of processing cores and a memory size to process the job; and
allocating, by the master computing node, one or more worker computing nodes having the determining number of processing cores and memory size to process the job.

10. The method of claim 8, wherein determining whether the identifier associated with the received query corresponds to the indexed identifier further comprises searching a lookup table within the search engine to determine whether the identifier associated with the received query corresponds to the indexed identifier.

11. The method of claim 8, further comprising:
scanning one or more topics of record data to determine records corresponding to responses to the received query, the record data includes the attribute data describing the record data; and
indexing the record data and the attribute data corresponding to the responses to the received query.

12. The method of claim 8, further comprising determining, in response to determining the identifier for the received query does not correspond to the indexed identifier, other attribute data corresponding to the received query request from a distributed database.

13. The method of claim 12, wherein the determining the one or more attributes corresponding to the received query request from the distributed database comprises:
accessing full data sets within a data storage repository;
scanning one or more topics of record data of the full data sets to determine records corresponding to responses to the received query, the record data includes the other attribute data describing the record data; and
providing the other attribute data describing the record data from the full data set.

14. The method of claim 8 further comprises:
storing the one or more attributes in one or more storage systems of an external user file system;
receiving another query from an external user;
querying across the one or more storage systems to process the other received query;
combining, from the one or more storage systems, data corresponding to the other received query; and
providing the combined data as a response to the other received query.

15. A non-transitory computer readable medium having program instructions stored thereon, the program instructions executable by one or more processors, the program instructions comprising:
receiving a job including an identifier associated with a received query;
allocating computing power to one or more computing nodes to process the job;
whether the identifier corresponds to an indexed identifier in a search engine;
retrieving, by the search engine and in response to determining the received query corresponds to the indexed identifier, attribute data corresponding to the indexed identifier, wherein the search engine provides the attribute data and the indexed identifier to a processing engine;
generating, in response to determining the received query does not correspond to the indexed identifier by:
providing the received query to a distributed database management system implemented by the one or more computing nodes;
accessing, by the distributed database management system, a conduit engine;
generating, by the conduit engine, a read request to retrieve the attribute data corresponding to the job from a distributed streaming engine configured to subscribe to streams of records within an internal data storage repository;
receiving, by the conduit engine and in response to the read request, the attribute data from the distributed streaming engine;
storing, by the conduit engine, the attribute data in a file system associated with the distributed database management system, wherein the conduit engine is configured to channel the attribute data only to the file system; and
in response to writing the attribute data to the file system, obtaining, by the distributed database management system, the attribute data from the file system; and
in response to obtaining the attribute data, providing, by the distributed database management system, the attribute data to the processing engine;
based at least in part on the attribute data and the indexed identifier, processing the job for the received query; and
providing a response to the received query request, the response including the attribute data.

16. The non-transitory computer readable medium of claim 15, wherein allocating the computing power comprises:
determining, by a master computing node, a number of processing cores and a memory size to process the job; and
allocating, by the master computing node, one or more worker computing nodes having the determining number of processing cores and memory size to process the job.

17. The non-transitory computer readable medium of claim 15, wherein the program instructions further comprise:
scanning one or more topics of record data to determine records corresponding to responses to the received query, the record data includes the attribute data describing the record data; and
indexing the record data and the attribute data corresponding to the responses to the received query.

18. The non-transitory computer readable medium of claim 15, wherein the program instructions further comprise determining, in response to determining the identifier associated with the received query for the received query does not correspond to the indexed identifier, other attribute data corresponding to the received query request from a distributed database.

19. The non-transitory computer readable medium of claim 18, wherein the determining the one or more attributes corresponding to the received query request from the distributed database comprises:
accessing full data sets within a data storage repository;
scanning one or more topics of record data of the full data sets to determine records corresponding to responses to the received query, the record data includes the other attribute data describing the record data; and
providing the other attribute data describing the record data from the full data set.

20. The non-transitory computer readable medium of claim 15, wherein the program instructions further comprise:
storing the one or more attributes in one or more storage systems of an external user file system;
receiving another query from an external user;
querying across the one or more storage systems to process the other received query;
combining, from the one or more storage systems, data corresponding to the other received query; and providing the combined data as a response to the other received query.

\* \* \* \* \*